(12) United States Patent
Pollock et al.

(10) Patent No.: US 9,917,481 B2
(45) Date of Patent: Mar. 13, 2018

(54) SYNCHRONOUS RELUCTANCE MACHINE (71) Applicant: TECHNELEC LTD, Leicestershire (GB)

(72) Inventors: Charles Pollock, Leicestershire (GB); Helen Pollock, Leicestershire (GB)

(73) Assignee: TECHNELEC LTD, Oakham (GB)

(*) Notice: Subject to any disclaimer, the term of this patent is extended or adjusted under 35 U.S.C. 154(b) by 0 days.

(21) Appl. No.: 15/313,522

(22) PCT Filed: May 22, 2015

(86) PCT No.: PCT/GB2015/051512
§ 371 (c)(1),
(2) Date: Nov. 22, 2016

(87) PCT Pub. No.: WO2015/177565
PCT Pub. Date: Nov. 26, 2015

(65) Prior Publication Data
US 2017/0201136 A1 Jul. 13, 2017

(30) Foreign Application Priority Data
May 23, 2014 (GB) .................................. 1409281.1

(51) Int. Cl.
H02K 1/14 (2006.01)
H02K 1/24 (2006.01)
(Continued)

(52) U.S. Cl.
CPC ............ *H02K 1/246* (2013.01); *H02K 1/146* (2013.01); *H02K 21/16* (2013.01); *H02K 1/2766* (2013.01); *H02K 2213/03* (2013.01)

(58) Field of Classification Search
CPC ........ H02K 1/146; H02K 1/246; H02K 21/16; H02K 2213/03; H02K 1/14; H02K 1/24
(Continued)

(56) References Cited

U.S. PATENT DOCUMENTS 3,652,885 A 3/1972 Hongsinger
5,818,140 A 10/1998 Vagati
(Continued)

FOREIGN PATENT DOCUMENTS

EP 1 184 956 A1 3/2002
EP 2 790 296 A1 10/2014
(Continued)

OTHER PUBLICATIONS

British Search and Examination Report dated Dec. 29, 2015 for corresponding British Application No. GB1409281.1.
(Continued)

*Primary Examiner* — John K Kim
(74) *Attorney, Agent, or Firm* — Renner Otto Boisselle & Sklar, LLP (57) ABSTRACT There is described a synchronous reluctance machine having a plurality of poles and comprising a stator with a plurality of spaced slots and a rotor. The rotor has one direct axis and one quadrature axis for each pole and comprises a plurality of flux barriers, each extending to a circumference thereof at least one barrier point. Successive angular separations between barrier points around the circumference of the rotor increase or decrease when moving around half a pole pitch from an initial axis to an adjacent finishing axis, the initial axis being one of a direct axis or a quadrature axis and the finishing axis being the other of a direct axis and a quadrature axis. The increase or decrease in size may be governed by a systematic progressive series.

13 Claims, 11 Drawing Sheets (51) Int. Cl.
*H02K 21/16* (2006.01)
*H02K 1/27* (2006.01)

(58) Field of Classification Search
USPC .......................... 310/168, 216.075, 216.107
See application file for complete search history.

(56) References Cited

U.S. PATENT DOCUMENTS

| | | | | |
|---|---|---|---|---|
| 5,903,080 | A * | 5/1999 | Nashiki | H02K 1/246 310/162 |
| 6,239,526 | B1 | 5/2001 | Oh et al. | |
| 6,300,703 | B1 * | 10/2001 | Kawano | H02K 1/246 310/162 |
| 2006/0043812 | A1 * | 3/2006 | Cheong | H01F 13/003 310/156.53 |
| 2012/0062053 | A1 * | 3/2012 | Moghaddam | H02K 1/246 310/46 |

FOREIGN PATENT DOCUMENTS

| | | |
|---|---|---|
| GB | 1 337 785 | 11/1973 |
| GB | 2 378 323 A | 2/2003 |
| JP | 2001-037127 A | 2/2001 |
| JP | 2009-077458 A | 4/2009 |
| KR | 20100080653 A | 7/2010 |
| WO | WO 2010/102671 A1 | 9/2010 |
| WO | WO 2010/131233 A2 | 11/2010 |
| WO | WO 2015/170352 A1 | 11/2015 |

OTHER PUBLICATIONS

British Examination Report dated Jul. 25, 2016 for corresponding British Application No. GB1409281.1.
International Search Report and Written Opinion for corresponding International Application No. PCT/GB2015/051512 dated Jul. 21, 2015.
Seok-Hee Han et al; "Design Tradeoffs between Stator Core Loss and Torque Ripple in IPM Machines", Industry Applications Society Annual Meeting, 2008, IEEE, Piscataway, NJ, USA; Oct. 5, 2008, pp. 1-8, XP031353761.
Sanada M. et al; "Torque ripple improvement for synchronous reluctance motor using asymmetric flux barrier arrangement", Conference Record of the 2003 IEEE Industry Applications Conference; 38$^{th}$ IAS Annual Meeting, Salt Lake City, UT, Oct. 12-16, 2003; vol. 1; pp. 250-255, XP010676030.
Intention to Grant for corresponding British Application No. GB1409281.1, dated Dec. 30, 2016.
Examination Report for corresponding British Application No. GB1409281.1, dated Dec. 1, 2016.

* cited by examiner

Figure 15

SYNCHRONOUS RELUCTANCE MACHINE

The present invention relates to the design of synchronous reluctance machines and synchronous reluctance machines with permanent magnet assistance, particularly the rotor for such machines.

Synchronous reluctance machines have a multiphase stator winding arranged in a slotted stator, and a rotor having the same number of poles. The stator winding is usually three phase distributed winding with overlapping coils spanning more than 50% of the pole pitch, with the most common stator examples having 12, 18, 24, 36 or 48 slots. Stator windings with less than 50% of the pole pitch are also possible where short end windings are desired but typically they have lower performance due to the reduced mutual coupling between coils of different phases.

The rotor of the synchronous reluctance motor can be axially laminated with alternating layers of permeable and non-permeable steel, giving a high ratio between direct and quadrature reluctances. These axially laminated structures are difficult to manufacture cost effectively and do not provide high strength for rotation at speed and therefore for ease of manufacturing a transverse laminated structure is preferred.

A rotor with transverse laminations was presented by Honsinger in U.S. Pat. No. 3,652,885. The transverse laminated rotor has a pattern of slots stamped in each lamination. The slotting pattern creates regions of the air-gap surface of the rotor where the rotor has low permeability (also known as the direct axis or d-axis) and regions of the rotor where it is more difficult for magnetic flux produced by the stator to penetrate the surface of the rotor. These regions of high permeability are known as the quadrature axis or q-axis.

The interaction between the slotting on the rotor and the stator teeth and slotting creates torque variations or torque ripple. Torque ripple is undesirable due to the creation of acoustic noise and vibration.

Prior art methods exist for the reduction of the torque ripple by careful choice of the number of equivalent rotor slots just under the surface of the rotor. In U.S. Pat. No. 5,818,140 and Patent Application WO 2010/131233 the number of equivalent rotor slots per pole pair is recommended to be 4 more or 4 less than the number of stator slots per pole pair, to achieve the optimum performance. U.S. Pat. No. 5,818,140 also advises that the number of equivalent rotor slots per pole pair should not be equal to or differ by two from the number of stator slots per pole pair, if significant torque ripple is to be avoided.

U.S. Pat. No. 6,239,526 provides an alternative method by arranging that if one end of a rotor flux barrier is adjacent to a stator tooth, the other end should reach the surface of the rotor adjacent to a stator slot.

Whilst the methods described in the prior art provide for reduction in torque ripple they do not necessarily produce motor designs with highest efficiency. One reason for this is that by choosing to have 4 additional equivalent rotor slots compared to the number of stator slots can lead to a higher flux frequency in the rotor steel as the frequency of flux barriers passing the stator teeth is increased. The higher localised flux frequencies cause higher iron losses in the rotor, reducing the efficiency of the motor.

In accordance with one aspect of the present invention there is described a synchronous reluctance machine having a plurality of poles and comprising a stator with a plurality of spaced slots and a rotor. The rotor has one direct axis and one quadrature axis for each pole and comprises a plurality of flux barriers, each extending to a circumference thereof at at least one barrier point. Successive angular separations between barrier points around the circumference of the rotor increase or decrease when moving around half a pole pitch from an initial axis to an adjacent finishing axis, the initial axis being one of a direct axis or a quadrature axis and the finishing axis being the other of a direct axis and a quadrature axis. The increase or decrease in size may be governed by a systematic progressive series. In this context, it will be understood that the term "synchronous reluctance machine" is intended to cover both synchronous reluctance machines without permanent magnet assistance and synchronous reluctance machines with permanent magnet assistance.

Further aspects and preferred features are set out in claim 2 et seq.

In accordance with another aspect of the present invention there is described a rotor for a synchronous reluctance machine having a plurality of poles, the rotor comprising a plurality of flux barriers, each extending to a circumference thereof at at least one barrier point, the rotor having one direct axis and one quadrature axis for each pole, wherein successive angular separations between barrier points around the circumference of the rotor increase or decrease when moving around half a pole pitch from an initial axis to an adjacent finishing axis, the initial axis being one of a direct axis or a quadrature axis and the finishing axis being the other of a direct axis and a quadrature axis.

Thus the invention, at least in preferred embodiments, provides a rotor design technique for synchronous reluctance motors and permanent magnet assisted synchronous reluctance motors to have low torque ripple and low rotor iron loss. The technique for the placement and spacing between rotor flux barriers can be applied to any number of equivalent rotor barriers. The spacing between barriers calculated with the formulae disclosed herein can dramatically reduce the torque ripple in rotors with numbers of equivalent rotor barriers which would otherwise have been considered unsuitable. As a result of applying the techniques described herein it is possible to design rotors with high torque per ampere, low torque ripple and low rotor losses.

Some preferred embodiments of the invention will now be described by way of example only and with reference to the accompanying drawings, in which.

Figure 1:
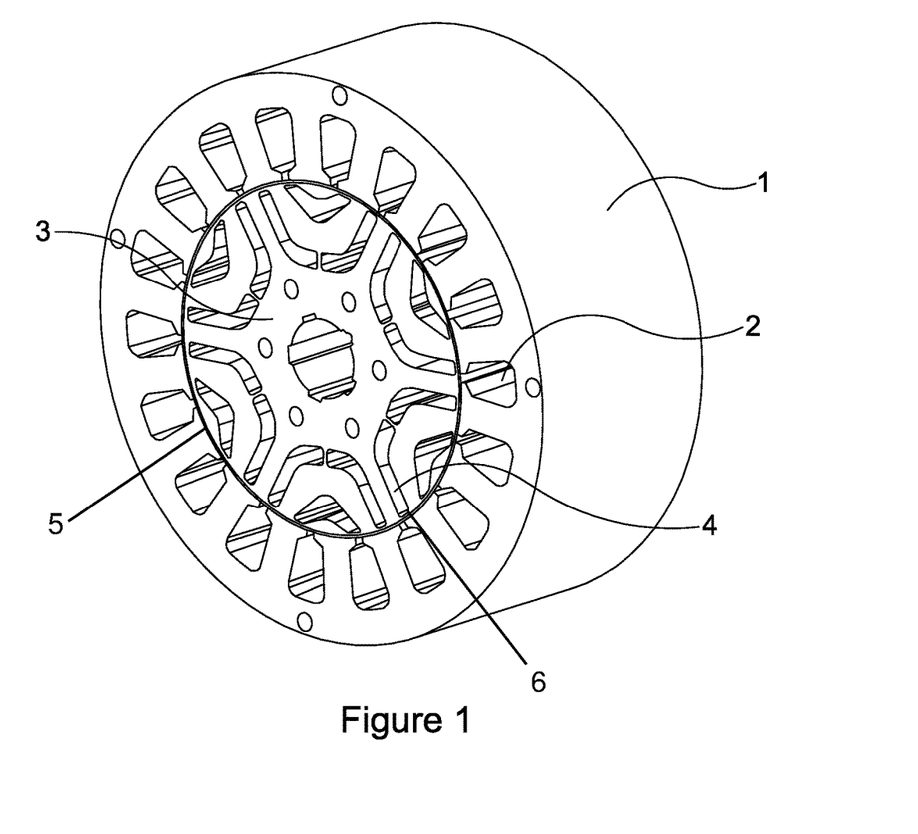
FIG. 1 shows the stator and rotor of a typical synchronous reluctance machine.

FIG. 1 shows the stator and rotor stack of a typical synchronous reluctance machine. The stator 1 will usually be a laminated stack with slots 2 running the length of the stator to carry the phase windings. The phase windings will usually comprise a three phase distributed winding. The windings are arranged to create magnetic poles inwardly directed within the stator towards the rotor. With three phase alternating currents in the stator windings a rotating magnetic field is produced in the air-gap between the stator 1 and the rotor 3.

The rotor 3 in FIG. 1 has slots 4 cut within its laminated structure. These slots are regions of high magnetic permeance and therefore create paths in the rotor of high reluctance. The slots 4 are therefore referred to as flux barriers. Each flux barrier 4 extends towards a circumference 5 of the rotor 3, and a conceptual "barrier point" 6 represents the point at which a middle axis 7 of the slot would intersect the circumference 5.

Figure 2:
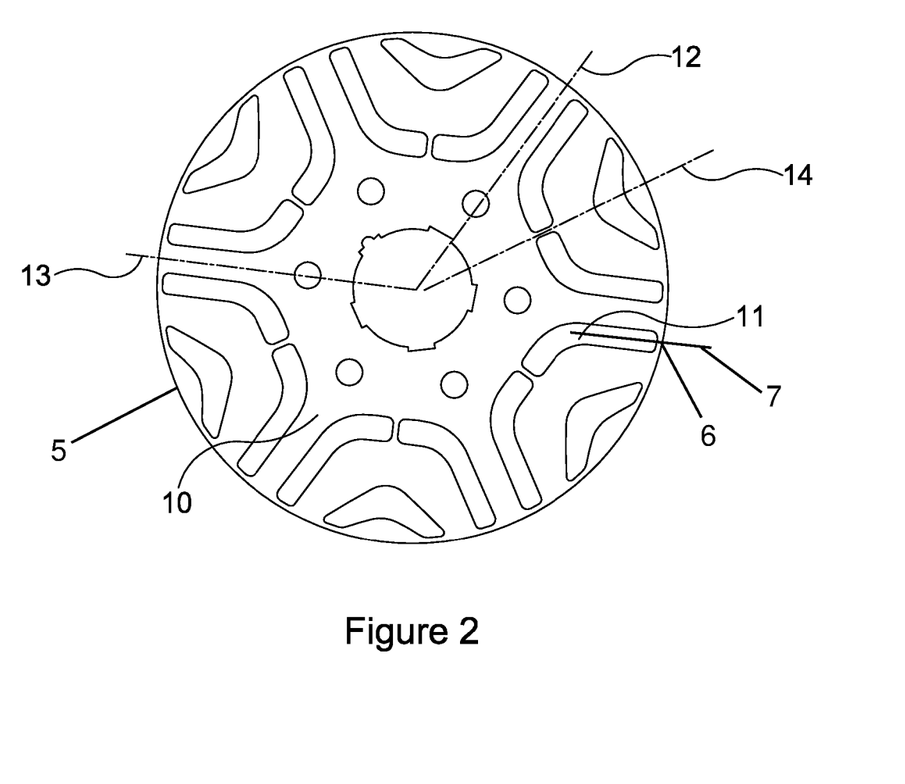
FIG. 2 shows the rotor of a typical synchronous reluctance machine.

FIG. 2 shows a more detailed view of one lamination 10 of the rotor 3. This particular example of rotor lamination has rotational symmetry of order 6. This means that it has a six pole pattern of flux barriers. Each pole has a direct axis 12 and quadrature axis 14. The angle between direct axis 12 and direct axis 13 is 120 degrees and includes two rotor pole pitches. The angle between a direct axis 12 and quadrature axis 14 is half a pole pitch. If the stator 1 surrounding the rotor 3 carries a 6 pole three phase winding disposed in the 18 slots 2 (1 slot per pole per phase) then the rotor laminations will orientate so that the direct axes line up with the magnetic poles created by the stator. In this orientation the stator flux can easily link from one direct axis to a neighbouring direct axis, along the line of the flux barriers. This is the path of lowest reluctance. It is difficult for the flux to pass from a quadrature axis to a neighbouring quadrature axis because that is a path of high reluctance.

As is well known in the art stators can have different numbers of slots. FIG. 1 shows a six pole stator with 18 slots. It would also be common for a six pole stator to have 36 slots. Four pole stators are commonly configured with 12, 24, 36 or 48 slots in the stator. The localised interaction between the flux of each stator tooth and the variations in reluctance around the rotor flux barriers creates variations in torque around the periphery of the airgap. As the rotor turns the total torque developed in the airgap will vary with position. Such variation leads to torque ripple. For smooth output torque and quiet motor operation it is advantageous to minimise torque ripple. The localised magnetic flux variations in the rotor around the flux barriers also cause iron losses due to eddy currents and hysteresis effects. It is important to minimise these effects if the synchronous reluctance motor is to achieve the highest efficiency with low rotor losses.

Figure 3:
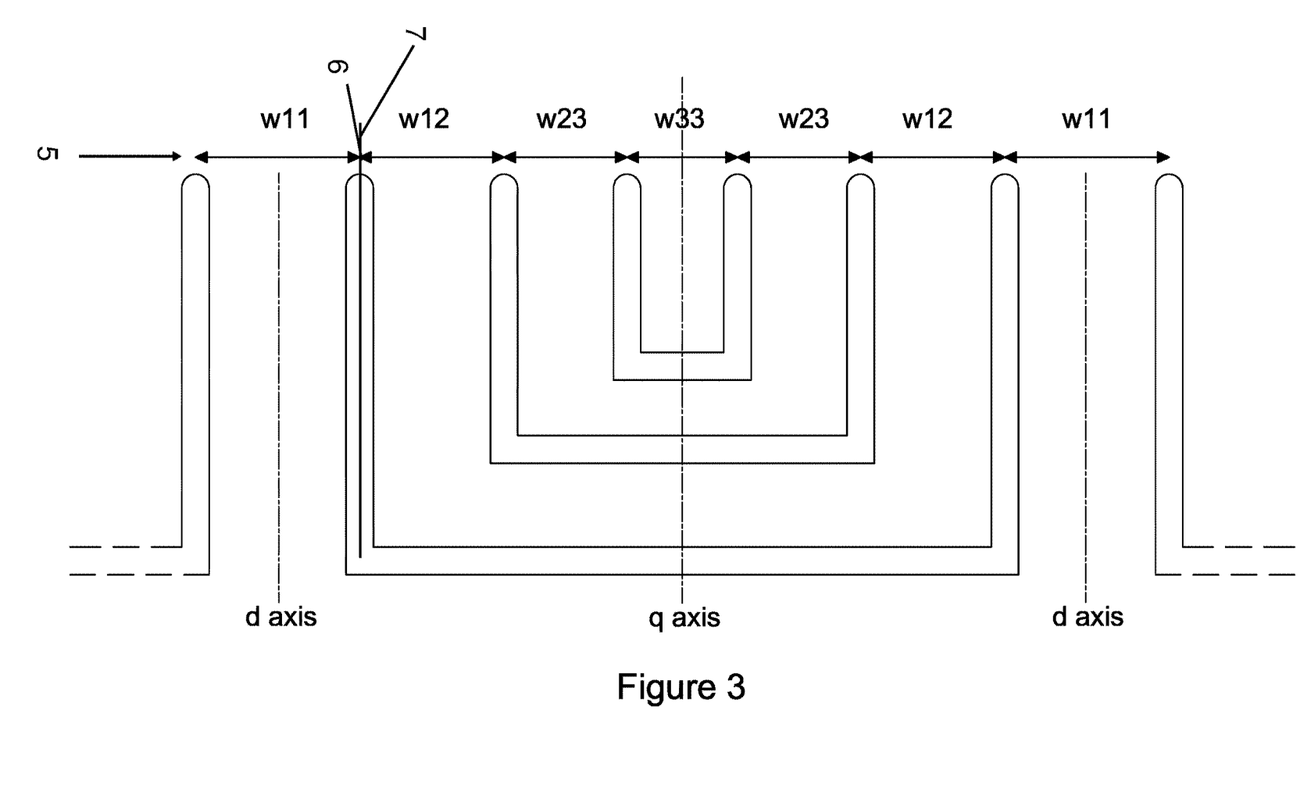
FIG. 3 shows a spacing arrangement of rotor flux barriers in a synchronous reluctance machine.

FIG. 3 shows a schematic of the spacing of one design of flux barrier placement for a synchronous reluctance rotor according to the invention. The schematic shows the spacing of the barriers in a linear fashion along the circumference of the rotor. The figure is drawn as if the surface of the rotor is unrolled into a straight line. In this example there are three rotor barriers separating each d axis and q axis of the rotor. The barrier spacing $w_{xx}$, each representing a fraction of a pole pitch, may be chosen to follow whereby:

$$w_{11} > w_{12} > w_{23} > w_{33} \tag{1}$$

In FIG. 3, starting at the direct axis and moving to the quadrature axis, there is a progressive reduction in the spacing between adjacent barriers.

And since the angular arc between two d axes (or two q axes) is a pole pitch $$w_{11} + 2w_{12} + 2w_{23} + w_{33} = 1 \tag{2}$$

The rotor pole pitch $\theta_p$ is given by $$\theta_p = \frac{360}{p} \tag{3}$$

where p the number of magnetic poles in the machine.

The example illustrated by FIG. 3 has the narrowest spacing between barriers on the q axis of the rotor. This is therefore referred to as the initial axis as it defines the starting value of an arithmetic series for all the subsequent barrier spacing. The constant $k_i$ is used to relate the initial spacing, a, to the stator tooth pitch. In FIG. 3 the barrier spacing on the d axis is the widest. In this example the d axis is referred to as the finishing axis of the series.

Figure 4:
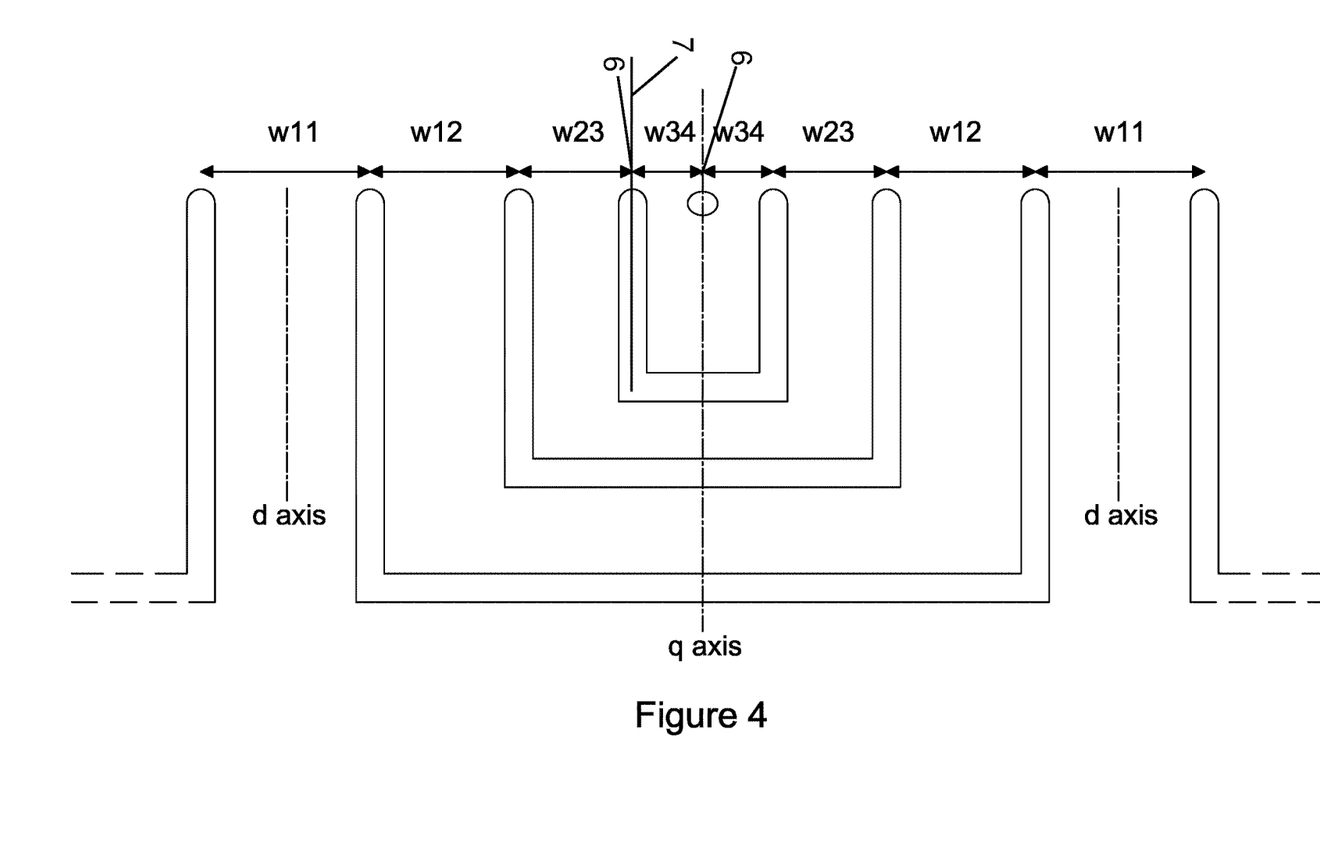
FIG. 4 shows an alternative spacing arrangement of rotor flux barriers in a synchronous reluctance machine.

FIG. 4 shows a schematic of the spacing of a second design of barriers for a synchronous reluctance rotor. The schematic shows the spacing of the barriers in a linear fashion along the circumference of the rotor. The figure is again drawn as if the surface of the rotor is unrolled into a straight line. In this example there are three rotor barriers separating each d axis and q axis of the rotor. The barrier spacing $w_{xx}$, each representing a fraction of a pole pitch, follows a pattern according to the invention whereby:

$$w_{11} > w_{12} > w_{23} > w_{34} \tag{4}$$

As in FIG. 3 the q axis is used as the initial axis with the narrowest barrier spacing and the d axis is the finishing axis with the widest barrier spacing. However, in contrast to FIG. 3 this example contains an extra barrier placement directly on the q axis. This extra barrier does not run from one half of the pole to the equivalent position on the other side of the q axis. The extra barrier may not even be present on the rotor or sometimes be used to locate a welding point or simply a q axis slot. However mathematically it exists to complete the progressive change in the barrier spacing from the direct axis to the quadrature axis.

Since the angular arc between two d axes (or two q axes) is a pole pitch then $$w_{11} + 2w_{12} + 2w_{23} + 2w_{34} = 1 \tag{5}$$

Figure 5:
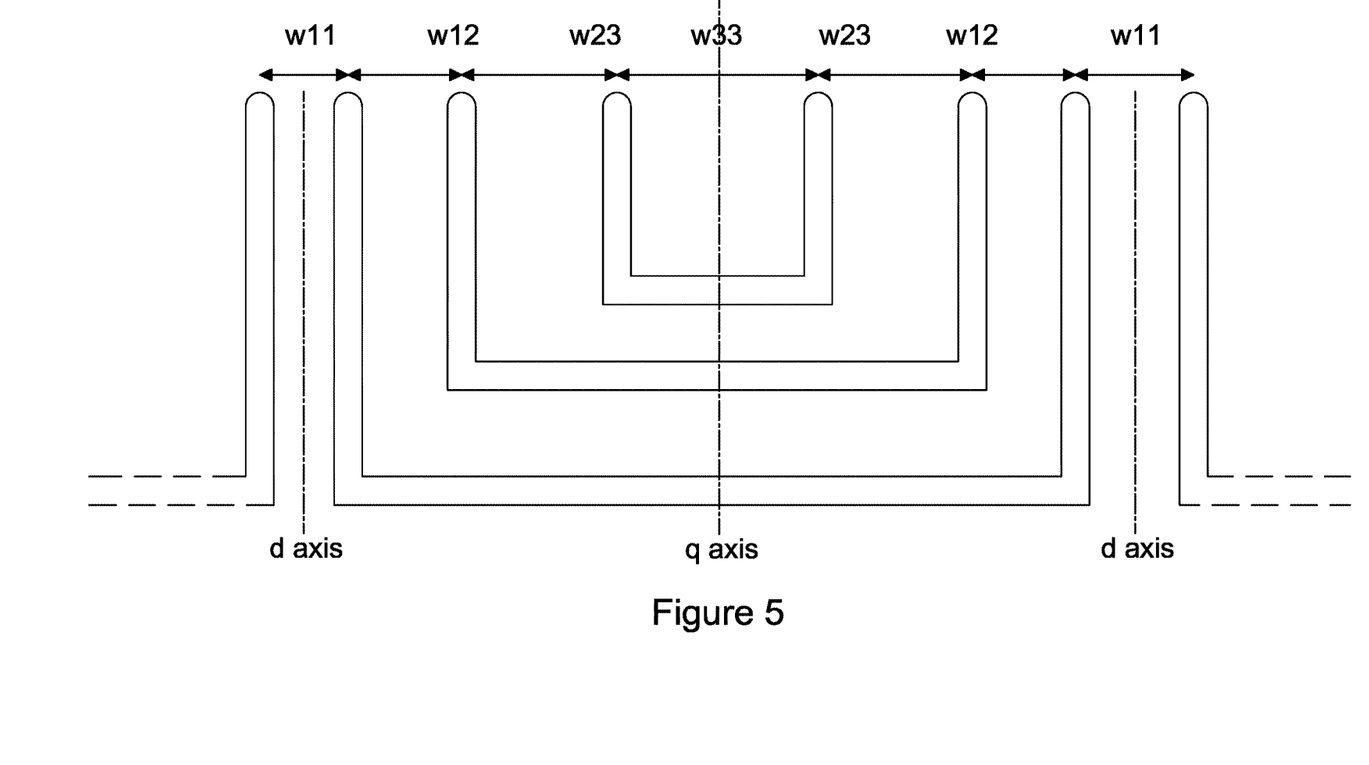
FIG. 5 shows a further alternative spacing arrangement of rotor flux barriers in a synchronous reluctance machine.

FIG. 5 shows an example where the narrowest barrier spacing is around the d axis and the angular space between adjacent barriers progressively increases while moving from the direct axis to the quadrature axis.

In order to provide the most effective reduction in torque ripple and minimise the iron losses in the rotor it is recommended to progressively and systematically change the spacing between successive rotor barriers from the initial axis to the finishing axis.

One systematic method which is particularly effective at reducing the torque ripple occurs if the spacing between the barriers in FIG. 3 follow an arithmetic series increasing from $w_{33}$ to $w_{11}$ $$w_{33} = a \quad (6)$$

$$w_{23} = a + d \quad (7)$$

$$w_{12} = a + 2d \quad (8)$$

$$w_{11} = a + 3d \quad (9)$$

And therefore $$w_{11} + 2w_{12} + 2w_{23} + w_{33} = 6a + 9d = 1 \text{ pole pitch} \quad (10)$$

If a is chosen to be a ratio $k_i$ of the stator tooth spacing (where $N_S$ is the number of stator teeth)

$$a = k_i \frac{p}{N_s} \quad (11)$$

Then the value for the common difference, d, can be determined from simultaneous solution of Equations (10) and (11)

$$d = \frac{1}{9} - \left(\frac{2}{3} \frac{k_i p}{N_s}\right) \quad (12)$$

If the spacing between the barriers in FIG. 4 follows an arithmetic series increasing from $w_{34}$ to $w_{11}$ $$w_{34} = a \quad (13)$$

$$w_{23} = a + d \quad (14)$$

$$w_{12} = a + 2d \quad (15)$$

$$w_{11} = a + 3d \quad (16)$$

And therefore $$w_{11} + 2w_{12} + 2w_{23} + 2w_{34} = 7a + 9d = 1 \text{ pole pitch} \quad (17)$$

If a is chosen to be a ratio $k_i$ of the stator tooth spacing as in equation (11), then the value for the common difference, d, for FIG. 4 can be determined from simultaneous solution of Equations (17) and (11)

$$d = \frac{1}{9} - \left(\frac{7}{9} \frac{k_i p}{N_s}\right) \quad (18)$$

As in FIG. 3, the example illustrated by FIG. 4 has the narrowest spacing between barriers on the q axis of the rotor. This is again referred to as the initial axis as it defines the starting value of the arithmetic series for all the subsequent barrier spacing. The constant $k_i$ is used to relate the initial spacing, a, to the stator tooth pitch. In FIG. 4 the barrier spacing on the d axis is the widest. In this example the d axis is again referred to as the finishing axis of the arithmetic series.

FIG. 5 shows an example where the narrowest barrier spacing is around the d axis. In this case the d axis would usually be referred to as the initial axis and would be the starting point for the arithmetic series.

$$w_{11} = a = k_i \frac{p}{N_s} \quad (19)$$

$$w_{11} < w_{12} < w_{23} < w_{33} \quad (20)$$

Since there is no extra barrier on either the initial axis or the finishing axis the equations developed for FIG. 3 apply and the common difference, d, is given by equation (12).

A more general formula for barrier spacing dependent on the number of barriers per half pole pitch can be derived from the summation of an arithmetic series. The sum of an arithmetic series is given by $$\sum_{k=0}^{n-1} (a + kd) = \frac{n}{2}(2a + (n-1)d) \quad (21)$$

In the case where there are $n_b$ barriers per half pole and the presence or absence of extra barriers at the initial axis or finishing axis of the barrier sequence is signified by the Boolean variables, $E_i$ and $E_f$ respectively, then the sum of the barrier spacing is $$\text{Pole Pitch} = 2\sum_{k=0}^{n_b} (a + kd) - (1 - E_i)(a) - (1 - E_f)(a + n_b d) \quad (22)$$

$$= (n_b + 1)(2a + n_b d) - (1 - E_i)(a) -$$

$$(1 - E_f)(a + n_b d)$$

Where $E_i$ and $E_f$ have the value 0 when there is no extra barrier on the initial or finishing axis or have the values 1 when there is an extra barrier on the respective axis (or spacing allocated to an extra barrier even if the barrier is not in existence).

Evaluation of the formula given in (23) for different values of $n_b$, $E_i$ and $E_f$ gives the values for the pole pitch summation in Table 1. Whilst Table 1 shows the pole pitch summations for two to five whole barriers per half pole pitch the formula can be extended for any number of full length barriers per half pole pitch.

TABLE 1

| | Ei | | | |
|---|---|---|---|---|
| | 0 | 0 | 1 | 1 |
| | | Ef | | |
| nb | 0 | 1 | 0 | 1 |
| 2 | 4a + 4d | 5a + 6d | 5a + 4d | 6a + 6d |
| 3 | 6a + 9d | 7a + 12d | 7a + 9d | 8a + 12d |
| 4 | 8a + 16d | 9a + 20d | 9a + 16d | 10a + 20d |
| 5 | 10a + 25d | 11a + 30d | 11a + 25d | 12a + 30d |

Given the summation of the pole pitch as calculated in Table 1 and a required value of $k_i$, the value of a can be calculated using equation (11). Since the summation value from Table 1 must always equal 1, the value of d can be determined.

Since a and d are then known the spacing of the barriers can be placed onto the rotor geometry to achieve the desired distribution according to the arithmetic series.

As the barrier spacings associated with the arithmetic series are not regular the torque ripple delivered can be minimised because the alignment between stator slots and rotor barriers has a geometrically distributed pattern over each pole. The method of barrier spacing described in this invention is particularly useful when the spacing of the rotor barriers would otherwise be close to the spacing between stator slots. Since the choice of initial and finishing axes is arbitrary, the values of common difference, d, can be positive or negative.

Another method to systematically and progressively change the barrier spacing between the initial axis and the finishing axis can be achieved if the spacing between the barriers follow a geometric series. In FIG. 3 as the spacing increases from $w_{33}$ to $w_{11}$ it can follow a geometric series where $$w_{33}=a \quad (23)$$

$$w_{23}=ar \quad (24)$$

$$w_{12}=ar^2 \quad (25)$$

$$w_{11}=ar^3 \quad (26)$$

And therefore $$w_{11}+2w_{12}+2w_{23}+w_{33}=a(1+2r+2r^2+r^3)=1 \text{ pole pitch} \quad (27)$$

If a is chosen to be a ratio $k_i$ of the stator tooth spacing given by equation (11), then the value for the common ratio, r, can be determined from simultaneous solution of Equations (27) and (11) such that r is given by the solution of the following equation $$\left(\frac{k_i p}{N_s}\right)(1+2r+2r^2+r^3) = 1 \quad (28)$$

Implementation of the systematic and progressive change in spacing between adjacent barriers illustrated by FIG. 4 can also be implemented by a geometric series. This example contains an extra barrier placement directly on the q axis. If the spacing between the barriers follows a geometric series increasing from $w_{34}$ to $w_{11}$ $$w_{34}=a \quad (29)$$

$$w_{23}=ar \quad (30)$$

$$w_{12}=ar^2 \quad (31)$$

$$w_{11}=ar^3 \quad (32)$$

And therefore $$w_{11}+2w_{12}+2w_{23}+2w_{34}=a(2+2r+2r^2+r^3)=1 \text{ pole pitch} \quad (33)$$

If a is chosen to be a ratio $k_i$ of the stator tooth spacing according to equation (11) then the value for the common difference, d, can be determined from simultaneous solution of Equations (33) and (11) such that r is given by the solution of the following equation $$\left(\frac{k_i p}{N_s}\right)(1+2r+2r^2+r^3) = 1 \quad (34)$$

As in FIG. 3, the example illustrated by FIG. 4 has the narrowest spacing between barriers on the q axis of the rotor. This is again referred to as the initial axis as it defines the starting value of the geometric series for all the subsequent barrier spacing. The constant $k_i$ is used to relate the initial spacing, a, to the stator tooth pitch. In FIG. 4 the barrier spacing on the d axis is the widest. In this example the d axis is again referred to as the finishing axis of the geometric series.

FIG. 5 shows an example where the narrowest barrier spacing is around the d axis. In this case the d axis would be referred to as the initial axis and would be the starting point for the geometric series. Since there is no extra barrier on either the initial axis or the finishing axis the equations developed for FIG. 3 apply and the common ratio, r, is given by equation (28).

A more general formula for barrier spacing dependent on the number of barriers per half pole pitch can be derived from the summation of a geometric series. The sum of a geometric series is given by $$\sum_{k=0}^{n-1}(ar^k) = a\frac{1-r^n}{1-r} \quad (35)$$

In the case where there are $n_b$ barriers per half pole and the presence or absence of extra barriers at the initial axis or finishing axis of the barrier sequence is signified by the Boolean variables, $E_i$ and $E_f$ respectively, then the sum of the barrier spacing is $$\text{Pole Pitch} = 2\sum_{k=0}^{n_b}(ar^k) - (1-E_i)(a) - (1-E_f)(ar^{n_b}) \quad (36)$$

$$= \left(2a\frac{1-r^{(n_b+1)}}{1-r}\right) - (1-E_i)(a) - (1-E_f)(ar^{n_b})$$

Where $E_i$ and $E_f$ have the value 0 when there is no extra barrier on the initial or finishing axis or have the values 1 when there is an extra barrier on the respective axis (or spacing allocated to an extra barrier even if the barrier is not in existence).

Evaluation of the formula given in (36) for different values of $n_b$, $E_i$ and $E_f$ gives the values for the pole pitch summation in Table 2. Whilst Table 2 shows the pole pitch summations for two to five whole barriers per half pole pitch the formula can be extended for any number of full length barriers per half pole pitch.

TABLE 2

| $n_b$ | $E_i$ = 0, $E_f$ = 0 | $E_i$ = 0, $E_f$ = 1 | $E_i$ = 1, $E_f$ = 0 | $E_i$ = 1, $E_f$ = 1 |
|---|---|---|---|---|
| 2 | $a\left(\dfrac{1+r-r^2-r^3}{1-r}\right)$ | $a\left(\dfrac{1+r-2r^3}{1-r}\right)$ | $a\left(\dfrac{2-r^2-r^3}{1-r}\right)$ | $2a\left(\dfrac{1-r^3}{1-r}\right)$ |
| 3 | $a\left(\dfrac{1+r-r^3-r^4}{1-r}\right)$ | $a\left(\dfrac{1+r-2r^4}{1-r}\right)$ | $a\left(\dfrac{2-r^3-r^4}{1-r}\right)$ | $2a\left(\dfrac{1-r^4}{1-r}\right)$ |
| 4 | $a\left(\dfrac{1+r-r^4-r^5}{1-r}\right)$ | $a\left(\dfrac{1+r-2r^5}{1-r}\right)$ | $a\left(\dfrac{2-r^4-r^5}{1-r}\right)$ | $2a\left(\dfrac{1-r^5}{1-r}\right)$ |
| 5 | $a\left(\dfrac{1+r-r^5-r^6}{1-r}\right)$ | $a\left(\dfrac{1+r-2r^6}{1-r}\right)$ | $a\left(\dfrac{2-r^5-r^6}{1-r}\right)$ | $2a\left(\dfrac{1-r^6}{1-r}\right)$ |

Given the summation of the pole pitch as calculated in Table 2 and a required value of $k_i$, the value of a can be calculated using equation (11). Since the summation value from Table 2 must always equal 1, the value of r can be determined.

Since a and r are then known the spacing of the barriers can be placed onto the rotor geometry to achieve the desired distribution according to the geometric series.

As the barrier spacings associated with the geometric series are not regular the torque ripple delivered can be minimised because the alignment between stator slots and rotor barriers has a geometrically distributed pattern over each pole. The method of barrier spacing described in this invention is particularly useful when the spacing of the rotor barriers would otherwise be close to the spacing between stator slots.

Table 3 lists some common combinations of stator slots and rotor barriers for 4 pole motors with 36 stator slots and 24 stator slots. The examples cover all the cases where the number of barriers, $n_b$, guiding flux from one pole face to a neighbouring pole face are either 3 or 4. The presence of an extra barrier placement on either the initial axis or the finishing axis is indicated by the value of $E_i$ and $E_f$ respectively. The final column shows the total number of apparent rotor barrier end positions for two pole pitches. A barrier need not exist in all the end positions providing the spacing pattern is retained.

TABLE 3

| Ns | Poles | Stator slots per pole pair | $n_b$ | $E_i$ | $E_f$ | Rotor barrier end positions per pole pair |
|---|---|---|---|---|---|---|
| 36 | 4 | 18 | 3 | 0 | 0 | 12 |
| 36 | 4 | 18 | 3 | 0 | 1 | 14 |
| 36 | 4 | 18 | 3 | 1 | 0 | 14 |
| 36 | 4 | 18 | 3 | 1 | 1 | 16* |
| 36 | 4 | 18 | 4 | 0 | 0 | 16* |
| 36 | 4 | 18 | 4 | 0 | 1 | 18* |
| 36 | 4 | 18 | 4 | 1 | 0 | 18* |
| 36 | 4 | 18 | 4 | 1 | 1 | 20* |
| 24 | 4 | 12 | 3 | 0 | 0 | 12* |
| 24 | 4 | 12 | 3 | 0 | 1 | 14* |
| 24 | 4 | 12 | 3 | 1 | 0 | 14* |
| 24 | 4 | 12 | 3 | 1 | 1 | 16 |
| 24 | 4 | 12 | 4 | 0 | 0 | 16 |
| 24 | 4 | 12 | 4 | 0 | 1 | 18 |
| 24 | 4 | 12 | 4 | 1 | 0 | 18 |
| 24 | 4 | 12 | 4 | 1 | 1 | 20 |

The cases highlighted with the asterisk are cases where the rotor barrier end positions per pole pair are equal to or within two of the stator slots per pole pair. Prior art publications (Vagatti U.S. Pat. No. 5,818,140) have specifically eliminated these combinations as having high torque ripple However, because of the close similarity of the numbers of barrier placements per pole pair and the number of stator slots per pole pair, these can be designs which also offer high torque per ampere. The implementation of a variable barrier spacing progressively and systematically changing from an initial axis to a finishing axis provides a significant reduction in torque ripple and allows these combinations to be suitable for high performance synchronous reluctance designs.

Figure 6:
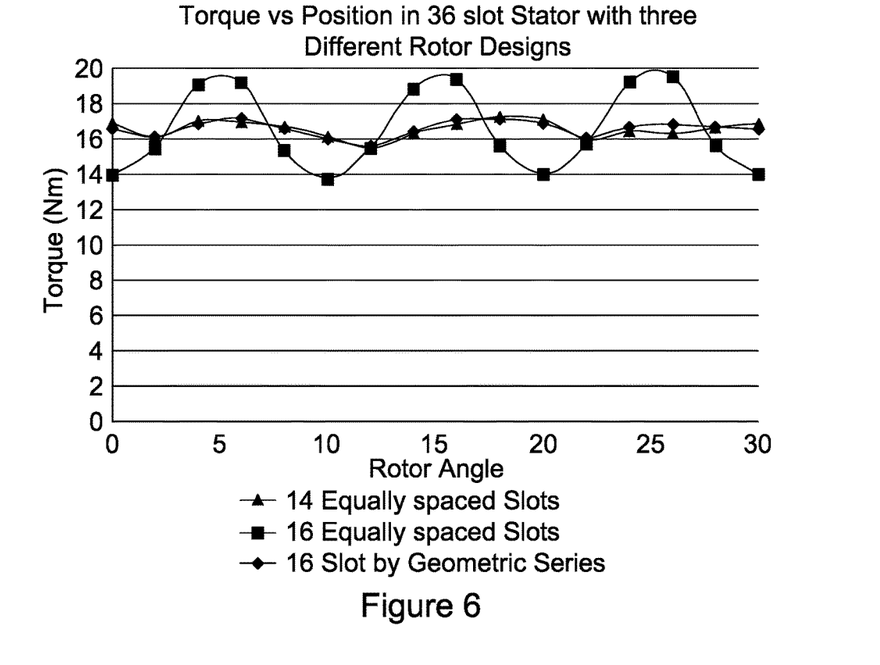
FIG. 6 shows torque versus angle characteristic for machines constructed using different rotor designs.

FIG. 6 gives an example of the torque calculated by finite element analysis over a 30 degree rotation of the rotor with the stator field moving through an equivalent angle to retain synchronism with the rotor. The stator used for the analysis in FIG. 6 has 36 slots. The first line with triangular markers implements the third line of the Table 2 to give 14 equivalent barrier end positions per pole pair. This is 4 less than the number of stator slots per pole pair which in this case is 18. In U.S. Pat. No. 5,818,140 and Patent Application WO 2010/131233 the number of equivalent rotor slots per pole pair is recommended to be 4 more or 4 less than the number of stator slots per pole pair, to achieve the minimum torque ripple. The torque ripple associated with such a design is shown by the line with the triangular markers and is relatively low. The line with the square markers is the torque output from a rotor with 16 equivalent barrier placements per pole pair. This was created by the fifth line of Table 2 using $n_b$=4, $E_i$=0 and $E_f$=0. The torque ripple with this design is unacceptably high: this is a result predicted by the prior art. However, taking the 16 equivalent slots per pair of poles and superimposing a spacing pattern using an arithmetic series as described above delivers the torque of the diamond markers with low torque ripple. The arithmetic series has made small but extremely significant changes to the spacing pattern of each barrier such that the torque ripple is completely destroyed. As a result of using the arithmetic series to calculate the barrier spacings it is possible to choose the number of barriers for optimum torque per ampere and minimum iron losses and to then use the arithmetic series to progressively increase the spacing from the initial axis to the final axis to eliminate the torque ripple.

Figure 7:
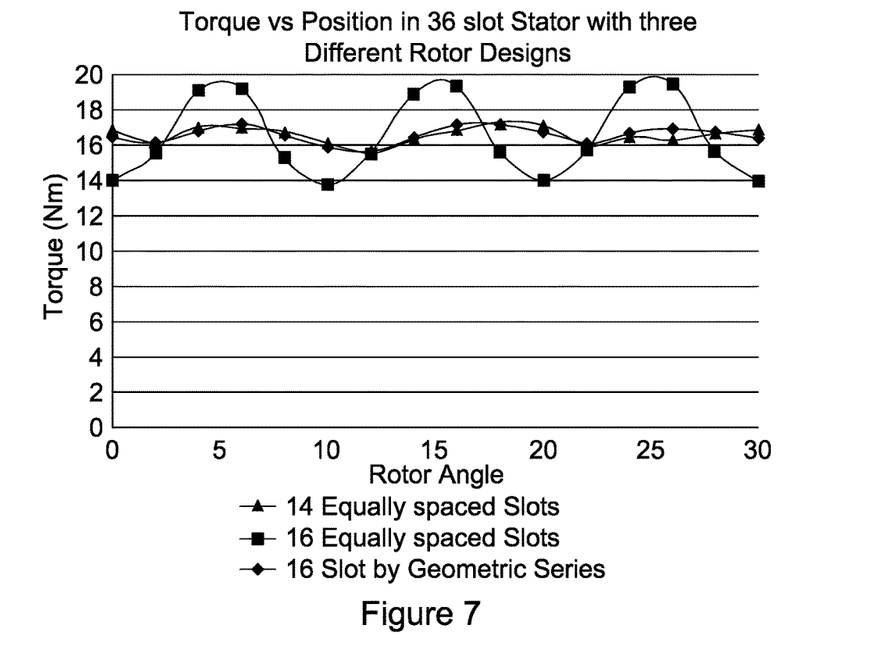
FIG. 7 shows further torque versus angle characteristics for machines constructed using different rotor designs.

FIG. 7 shows that a similar result can be achieved by progressively and systematically changing the barrier spacing according to a geometric series. It will be noted that the result achieved in FIG. 7 is very similar to the result in FIG. 6. This is because the same spacing was used for the initial axis and, since the number of terms in the arithmetic series or geometric series is quite small, in these examples the two series have not diverged significantly.

Figure 8:
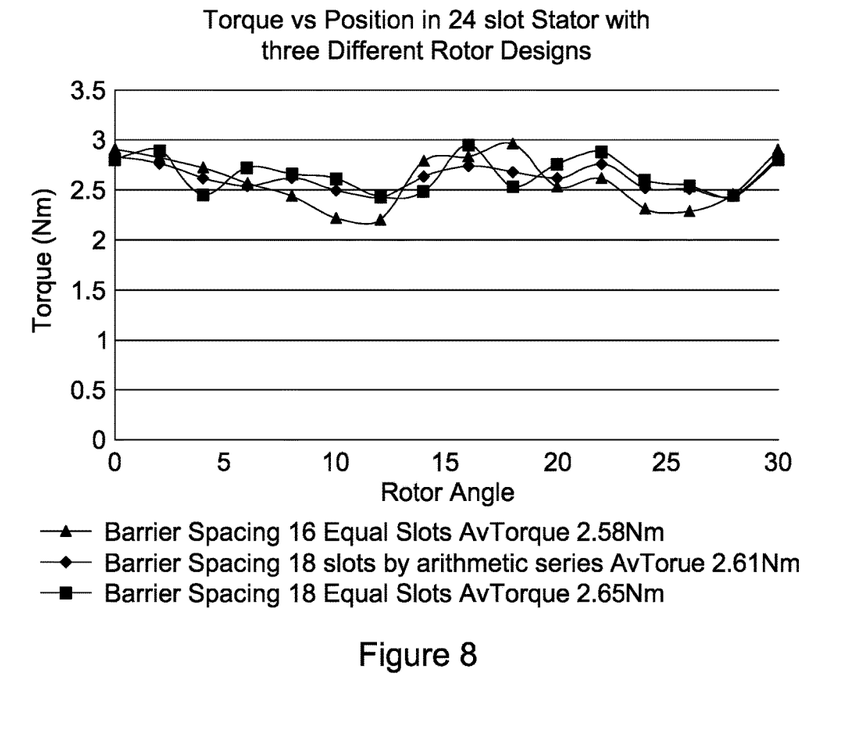
FIG. 8 shows further torque versus angle characteristics for machines constructed using different rotor designs.

FIG. 8 shows a further example of the result of implementing the arithmetic series according to the invention for 24 slot stators. The design with diamond markers has high torque and lower ripple than the design of the triangle markers. The triangle markers is a design which is implemented according to the prior art and the design according to the invention using an arithmetic series offers superior torque and lower torque ripple. A similar result can also be achieved with the geometric series.

Figure 9:
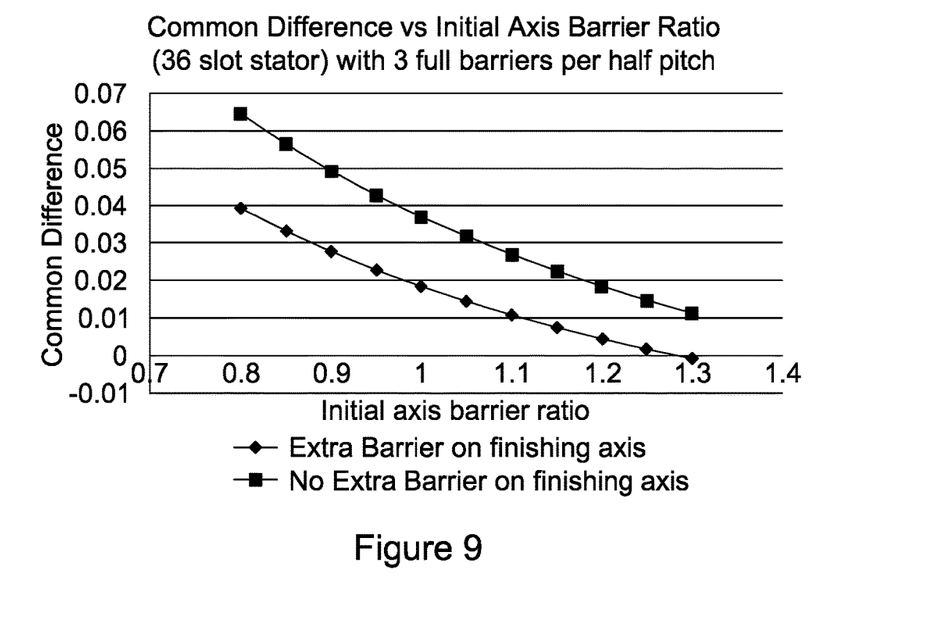
FIG. 9 shows how the common difference varies over a range of the initial axis barrier ratio when there are three rotor barriers per half pole.
Figure 10:
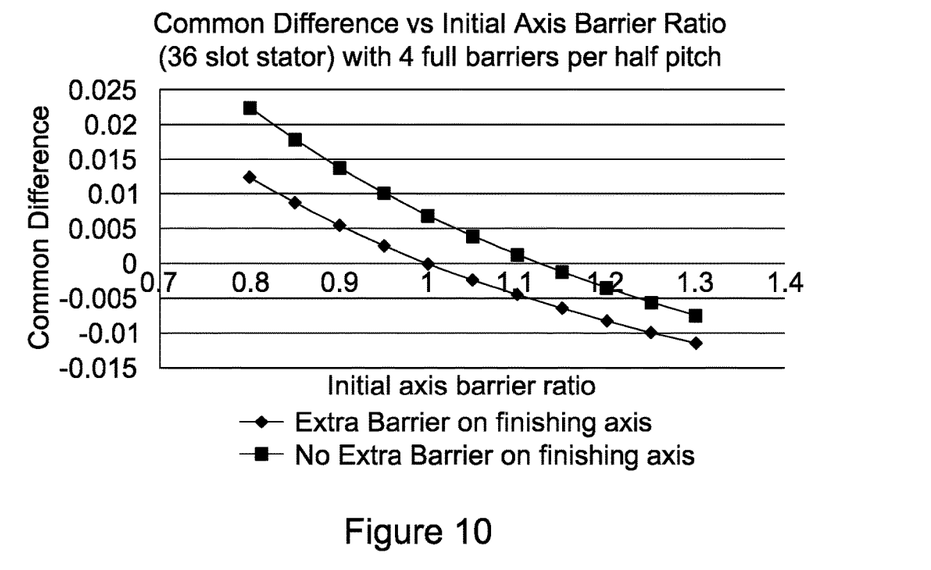
FIG. 10 shows how the common difference varies over a range of the initial axis barrier ratio when there are four rotor barriers per half pole.

FIGS. 9 and 10 show the variation in common difference, d, in rotor designs with progressive and systematic changes in spacing according to an arithmetic series. The plots show the variation in common difference, d, in 36 slot stators, depending on the initial axis barrier ratio $k_i$. FIG. 9 is calculated for 3 full barriers per half pitch. From Table 3 there are either 12 or 14 rotor barrier end positions per pole pair depending on the existence or not of a barrier point on the finishing axis. FIG. 10 is calculated for 4 full barriers per half pitch. From Table 3 there are therefore either 16 or 18 rotor barrier end positions per pole pair. Providing d is non zero the spacing between barriers will progressively change from the initial axis to the finishing axis. A positive value of common difference means that the barrier spacing will increase from the initial axis to the finishing axis. A negative value of common difference can also be chosen. This means that the barrier spacing will reduce from the initial axis to the finishing axis.

Figure 11:
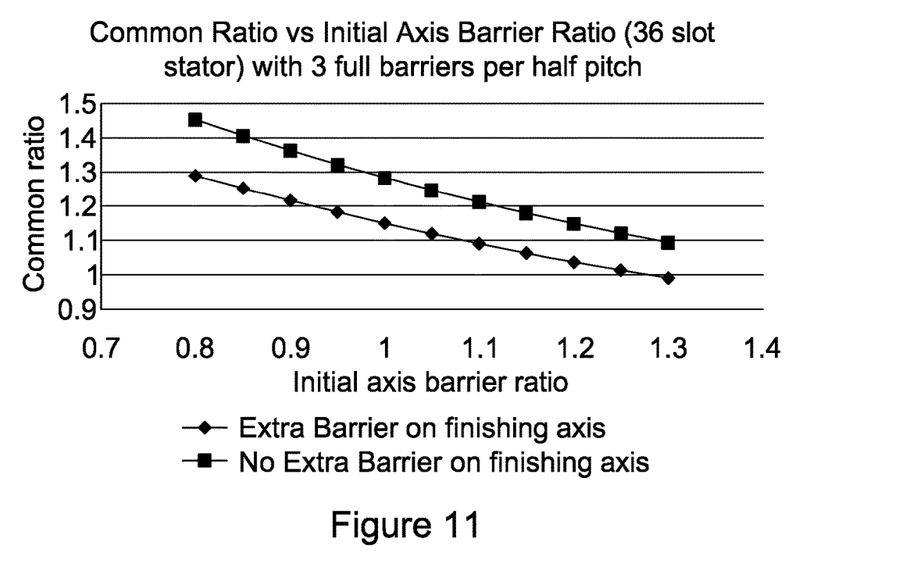
FIG. 11 shows how the common ratio varies over a range of the initial axis barrier ratio when there are three rotor barriers per half pole.
Figure 12:
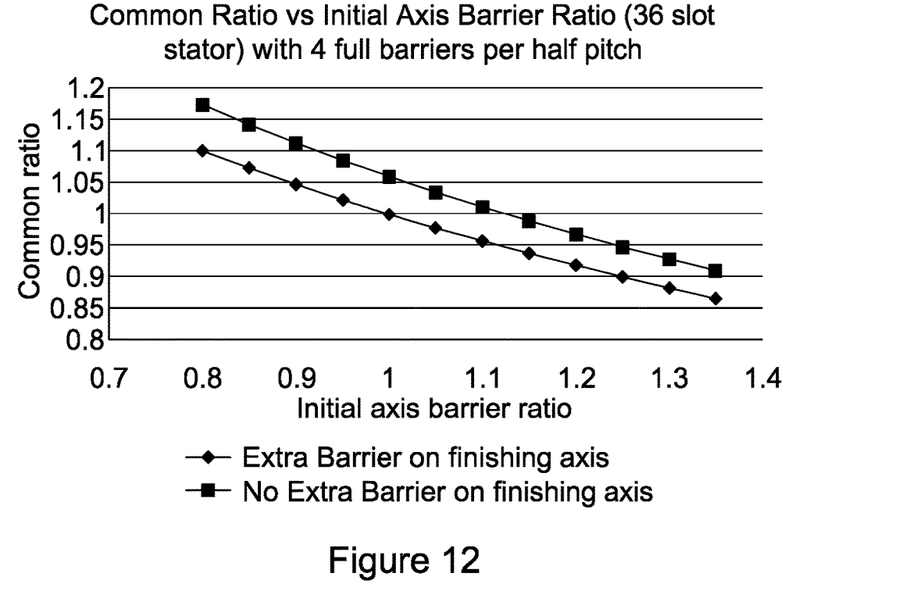
FIG. 12 shows how the common ratio varies over a range of the initial axis barrier ratio when there are four rotor barriers per half pole.

FIGS. 11 and 12 show the variation in common ratio, r, in rotor designs with progressive and systematic changes in spacing according to an geometric series. The plots show the variation in common ratio, r, in 36 slot stators, depending on the initial axis barrier ratio $k_i$. FIG. 11 is calculated for 3 full barriers per half pitch. FIG. 12 is calculated for 4 full barriers per half pitch with no extra barrier on either the initial or finishing axis. Providing r is not equal to one the spacing between barriers will progressively change from the initial axis to the finishing axis. A value of common ratio greater than one means that the barrier spacing will increase from the initial axis to the finishing axis. A value of common ratio less than one can also be chosen. This means that the barrier spacing will reduce from the initial axis to the finishing axis.

Figure 13:
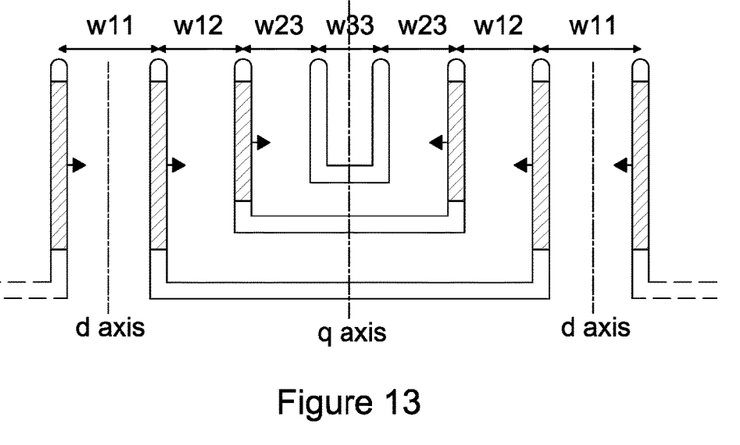
FIG. 13 shows a schematic of the spacing of one design of flux barrier placement for a synchronous reluctance rotor with permanent magnet assistance.

FIG. 13 shows a schematic of the spacing of one design of flux barrier placement for a synchronous reluctance rotor with permanent magnet assistance according to the invention. The schematic shows the spacing of the barriers in a linear fashion along the circumference of the rotor. The figure is drawn as if the surface of the rotor is unrolled into a straight line. In this example there are three rotor barriers separating each d axis and q axis of the rotor. The barrier spacing $w_{xx}$, each representing a fraction of a pole pitch, follows a pattern according to the invention whereby:

$$w_{11} > w_{12} > w_{23} > w_{33} \quad (37)$$

Magnets placed within the barriers are orientated with the same polarity directed to the q axis. An adjacent q axis will therefore have the opposite magnetic polarity. The effect of the magnets is to increase the difference between the d axis and q axis reluctance and therefore the permanent magnet assistance increases the torque and efficiency of the synchronous reluctance motor at a given current level.

By placing magnets in barriers which have their spacing arranged to follow the arithmetic series according to any implementation of the invention there is a progressive change in the barrier spacing from the d axis to the q axis. This progressive change is particularly effective in destroying any tendency for the magnet flux to lock onto the stator teeth reluctance, thus reducing the cogging torque. Furthermore, low order harmonics of the torque waveform are reduced in magnitude and the overall torque ripple of the motor is reduced. By using the arithmetic series to determine the spacing between the barriers of the permanent magnet assisted synchronous reluctance motor, it is possible to design rotors with numbers of barriers which (as illustrated in Table 3) were noted by the prior art as being high in torque ripple. Such rotor designs have previously been ignored but using the design methods of this invention they can be designed to offer superior performance.

Figure 14:
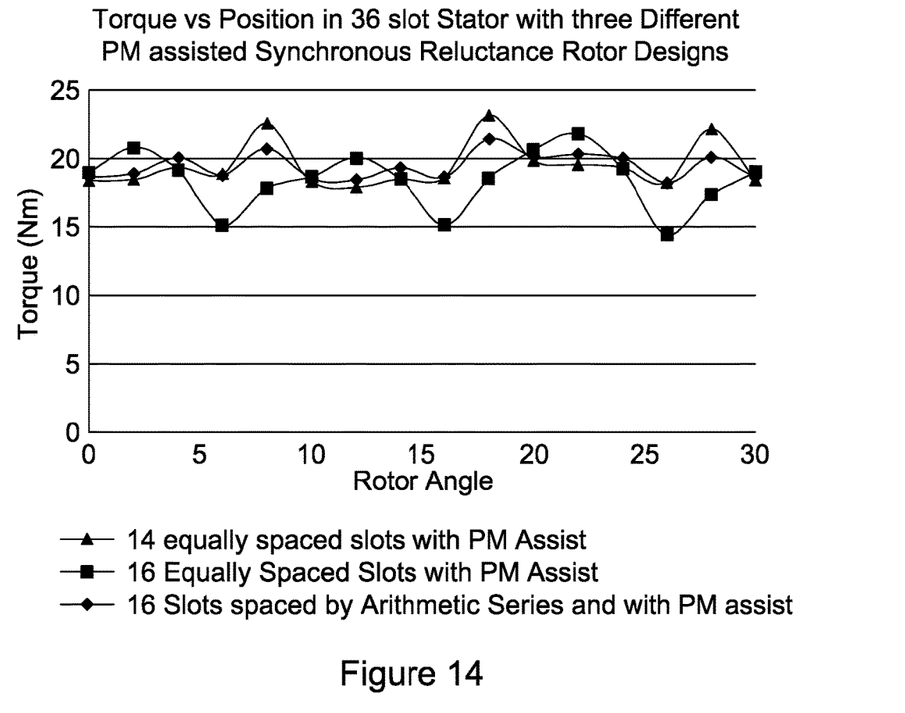
FIG. 14 shows a result of the calculated torque vs angle for a permanent magnet assisted synchronous reluctance motor designed according to this disclosure compared to designs with equally spaced rotor slots.

FIG. 14 shows one result of the calculated torque vs angle for a permanent magnet assisted synchronous reluctance motor designed according to this invention compared to designs with equally spaced rotor slots. The stator has 36 slots and is wound with a 4 pole winding. Rotors with 14 and 16 slots per pole pair are compared in FIG. 11. All the rotor designs have the same volume of permanent magnet assistance. The lowest torque ripple is delivered by the rotor design with progressive change of the rotor barrier spacing according to a arithmetic series and with 16 equivalent slots per pair of poles. The invention is therefore particularly suited to calculating the optimum spacing of the barriers in a permanent magnet assisted synchronous reluctance motor.

The geometric series also provides a method to reduce the torque ripple in the permanent magnet assisted synchronous reluctance motor. Both the geometric series and the arithmetic series provide systematic ways to progressively adjust the barrier spacing from an initial value at the initial axis to a smaller or larger value at the finishing axis. Other mathematical series could also be used providing they provide monotonic changes in the barrier spacing.

The barrier arrangement and magnet locations in FIG. 13 is for illustrative purposes of the spacing between the points where the tips of the barriers come closest to the rotor surface. In a practical rotor design the barrier shape is constrained by having to fit in the rotor lamination area between the rotor shaft and the surface of the rotor. It will be expected that sections of the barriers may be curved or arranged at angles other than right angles. Furthermore, for mechanical strength, it is usual, particularly in larger rotors to need bridging sections of lamination steel to provide radial support to the steel sections which are further from the shaft.

Figure 15:
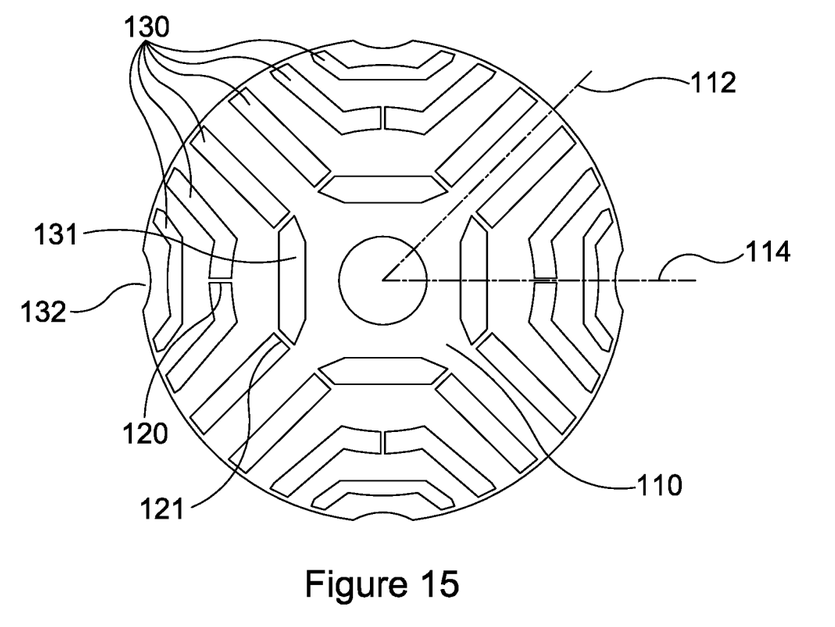
FIG. 15 shows an example of a practical rotor designed using the principles described herein.

FIG. 15 shows an example of a practical rotor designed according to the invention. The rotor lamination 110 is a 4 pole lamination with 4 direct axes, 112, and 4 quadrature axes, 114. The design implemented for the barrier spacing uses a arithmetic series to progressively reduce the barrier spacing from the widest at the d axis 112 to the narrowest spacing at the quadrature axis 114. In this example the initial axis is the direct axis and the finishing axis is the quadrature axis. There are 4 barriers within each half pole and a barrier position exists on the finishing axis giving a total of 18 rotor barriers points per pair of poles. The 4th barrier 132 closest to each quadrature axis has been cut away completely as the remaining steel would have little magnetic benefit. Removal of this steel section beyond the 4th barrier does not change the implementation of the geometric spacing formula which still defines the position where the cut should intersect the rotor circumference.

The lamination in FIG. 15 has been designed to be suitable for a synchronous reluctance motor with permanent magnet assistance. The slots forming the barriers 130 are all rectangular in shape so that a magnet could be contained within each of the 24 slots marked 130. Additionally it is possible to position the magnets for the permanent magnet assistance in slots which are parallel or approximately parallel to a tangent of the airgap surface of the rotor lamination. Such a magnet could be located in slots 131. Strengthening bridges 120,121 may be added to support the outer sections of the rotor against radial stress if the radius is large or rotational speeds are high.

The lamination in FIG. 15 has been designed for a 36 slot stator such that the space between the rotor barrier points on the initial axis (the d axis) is determined by ki=1.4. All the other barrier positions are then determined according to the equations of this invention and using a single value of common difference, d, equal to −0.0143 of the rotor pole pitch.

It is appreciated that the shape of the barriers as they come closest to the rotor surface can be different in different designs and some small variations will be expected in the placement of the barriers so that the best effect of the torque ripple reduction is achieved.

The invention claimed is:

1. A synchronous reluctance machine with or without permanent magnet assistance having a plurality of poles and comprising:
   a stator with a plurality of spaced slots; and
   a rotor comprising a plurality of flux barriers, each extending towards a circumference thereof such that a middle axis of the flux barrier intersects the circumference at a barrier point, the rotor having one direct axis and one quadrature axis for each pole;
   wherein successive angular separations between barrier points around the circumference of the rotor increase following a geometric or arithmetic sequence or decrease following a geometric or arithmetic sequence when moving around half a pole pitch from an initial axis to an adjacent finishing axis, the initial axis being one of a direct axis and a quadrature axis and the finishing axis being the other one of the direct axis and the quadrature axis.

2. The machine of claim 1, wherein the sequence is calculatable as though there is an additional barrier point at the initial axis and/or finishing axis, so that the angular separation from the initial axis to a first barrier point is treated as the first term in the sequence and/or the angular separation from the last barrier point to the finishing axis is treated as the last term in the sequence.

3. The machine of claim 1, wherein the sequence is calculatable on the basis that the angular separation between the last barrier point of one half pole pitch and an adjacent last barrier point of the next half pole pitch is treated as the last term in the sequence.

4. The machine of claim 1, wherein the first term of the sequence is chosen as $$a = k_i \frac{p}{N_s}$$

where a is a fraction of one pole pitch, $k_i$ is a constant, p is the number of poles and $N_S$ is the number of stator slots.

5. The machine of claim 1, wherein successive angular separations moving from the initial axis to the finishing axis follow an arithmetic sequence such that there is a common difference, d, in size between successive angular separations.

6. The machine of claim 5, wherein the sum of angular separations as a proportion of one pole pitch where there are $n_b$ barriers per half pole, and the presence or absence of extra barriers at the initial axis or finishing axis of the barrier sequence is signified by the Boolean variables, $E_i$ and $E_f$ respectively, is given by $$\text{Pole Pitch} = 2\sum_{k=0}^{n_b}(a+kd) - (1-E_i)(a) - (1-E_f)(a+n_bd)$$
$$= (n_b+1)(2a+n_bd) - (1-E_i)(a) - (1-E_f)(a+n_bd).$$

7. The machine of claim 1, wherein successive angular separations moving from the initial axis to the finishing axis follow a geometric sequence such that there is a common ratio, r, in size between successive angular separations.

8. The machine of claim 7, wherein the sum of angular separations as a proportion of one pole pitch where there are $n_b$ barriers per half pole and the presence or absence of extra barriers at the initial axis or finishing axis of the barrier sequence is signified by the Boolean variables, $E_i$ and $E_f$ respectively is given by:

$$\text{Pole Pitch} = 2\sum_{k=0}^{n_b}(ar^k) - (1-E_i)(a) - (1-E_f)(ar^{n_b})$$
$$= \left(2a\frac{1-r^{(n_b+1)}}{1-r}\right) - (1-E_i)(a) - (1-E_f)(ar^{n_b}).$$

9. The machine of claim 1, wherein the initial axis is a direct axis and successive angular separations between barrier points increase moving around the circumference of the rotor towards a quadrature axis.

10. The machine of claim 1, wherein the rotor is transversely laminated, and the flux barriers are provided in each lamination.

11. The machine of claim 1, wherein the flux barriers are formed as slots in the rotor.

12. The machine of claim 1, further comprising permanent magnets located within some or all of the flux barriers, all orientated with the same polarity directed to a quadrature axis.

13. A rotor for a synchronous reluctance machine having a plurality of poles, the rotor comprising a plurality of flux barriers, each extending towards a circumference thereof such that a middle axis of the flux barrier intersects the circumference at a barrier point, the rotor having one direct axis and one quadrature axis for each pole, wherein successive angular separations between barrier points around the circumference of the rotor increase following a geometric or arithmetic sequence or decrease following a geometric or arithmetic sequence when moving around half a pole pitch from an initial axis to an adjacent finishing axis, the initial axis being one of a direct axis and a quadrature axis and the finishing axis being the other one of the direct axis and the quadrature axis.

* * * * *